United States Patent

Guttmann et al.

[15] 3,666,762
[45] May 30, 1972

[54] 2'β-ISOPROPYL-5'α-N-PROPYL-9,10-DIHYDRO-ERGOPEPTINES

[72] Inventors: Stephan Guttmann, 18 Hegenheimermattweg 4123, Allschwil; Rene Huguenin, 25 Mattstuckweg, 4153, Reinach, Basel-land, both of Switzerland

[22] Filed: Nov. 3, 1969

[21] Appl. No.: 873,645

Related U.S. Application Data

[63] Continuation-in-part of Ser. No. 836,153, June 24, 1969, abandoned.

[30] Foreign Application Priority Data

June 25, 1968 Switzerland ..........................9515/68

[52] U.S. Cl. ..................260/268 PE, 424/261, 260/268 DK, 260/268 TR, 260/285.5
[51] Int. Cl. ............................................C07d 43/20
[58] Field of Search ............................................260/268 PE

[56] References Cited

UNITED STATES PATENTS

| | | | |
|---|---|---|---|
| 3,586,683 | 6/1971 | Stadler et al. | 260/268 PE |
| 3,113,133 | 12/1963 | Hofmann et al. | 260/268 PE |
| 3,227,719 | 1/1966 | Hofmann et al. | 260/268 TR |
| 3,428,639 | 2/1969 | Stadler et al. | 260/268 PE |

OTHER PUBLICATIONS

Stadler et al. Helv: Chim. Acta Vol. 52 pp. 1549, 1552 (1969)

*Primary Examiner*—Donald G. Daus
*Attorney*—Gerald D. Sharkin, Frederick H. Weinfeldt, Robert S. Honor, Walter F. Jewell and Richard E. Vila

[57] ABSTRACT

The invention concerns novel compounds of the formula:

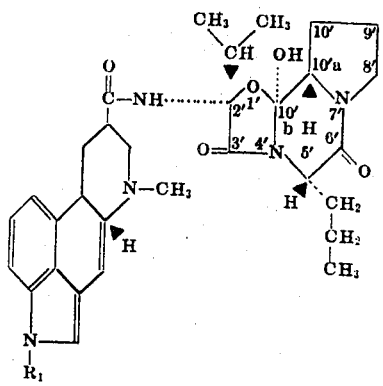

wherein $R_1$ is hydrogen or methyl, and acid addition salts thereof.

Processes and an intermediate employed for the production of the above compounds are also described.

The above compounds are useful in the treatment of circulatory illnesses, and the 1-methyl compound is also useful in stimulating prolactin secretion.

3 Claims, No Drawings

2'β-ISOPROPYL-5'α-N-PROPYL-9,10-DIHYDROERGOPEPTINES

This is a continuation in part of our application Ser. No. 836,153 filed June 24, 1969 now abandoned.

The present invention relates to new heterocyclic compounds of general formula I,

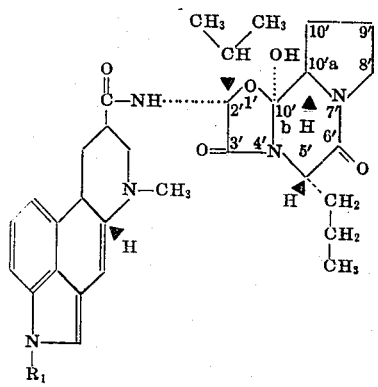

in which $R_1$ signifies hydrogen or the methyl radical, and acid addition salts thereof.

A compound of general formula I and an acid addition salt thereof may be obtained in accordance with the invention by condensing a salt of the compound of formula II,

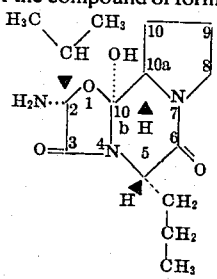

in a solvent which is inert under the reaction conditions and in the presence of a basic condensation agent, with a reactive functional derivative of an acid of general formula III,

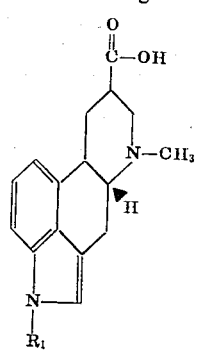

in which $R_1$ has the above significance, and salifying when an acid addition salt of the resulting compound of general formula I is required.

Suitable reactive functional derivatives of acids of general formula III are their acid chloride hydrochlorides, their mixed anhydrides with sulphuric acid or their azides.

The condensation of the compound of formula II in the form of a salt with the reactive functional derivative of an acid of general formula III is, for example, effected by suspending an acid chloride hydrochloride of an acid of general formula III in a solvent which is inert under the reaction conditions, e.g. methylene chloride, and then reacting this, between about −10° and about 0° C, with a salt of the compound of formula II, in the presence of a tertiary organic or a weak inorganic base.

Another method for the above condensation is as follows:

The mixed anhydride of an acid of general formula III with sulphuric acid is condensed in a solvent which is inert under the reaction conditions, e.g. dimethyl formamide, and in the presence of a tertiary organic base, between about −10° and about 0° C, with a salt of the compound of formula II.

In accordance with an embodiment of the present invention, a solution of an azide of an acid of general formula III is reacted with a salt of the compound of formula II at a temperature between about 0° C and room temperature, in the presence of a tertiary organic base.

The compound of general formula I, in which $R_1$ signifies the methyl radical, may also be obtained in accordance with the invention by methylating the compound of formula IV,

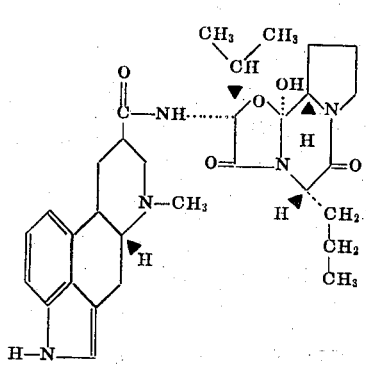

in the presence of a basic condensation agent, and optionally converting the resulting methylation product into an acid addition salt. An alkali metal alcoholate or alkali metal amide may, for example, be used as basic condensation agent.

One convenient manner of effecting the methylation process of the invention consists in adding portionwise metallic sodium or potassium to a solution of a lower aliphatic alcohol, e.g. ethanol, in liquid ammonia, and waiting for the solution to decolorize. The compound of formula IV is then added to the solution of the alkali metal alcoholate at a temperature between about −60° and about −30° C while stirring well. After the compound of formula IV has dissolved, methyl iodide is added, the ammonia is evaporated in a vacuum and the residue divided between an aqueous alkali metal carbonate solution and methylene chloride. The organic phase is then washed with water, dried over sodium sulphate and the methylene chloride is removed. About 5 mols of alkali metal alcoholate and about the same excess of methyl iodide are preferably used for every mol of the compound of formula IV in this reaction.

A compound of general formula I may also be obtained in accordance with the invention by catalytic hydrogenation of a compound of general formula XIII,

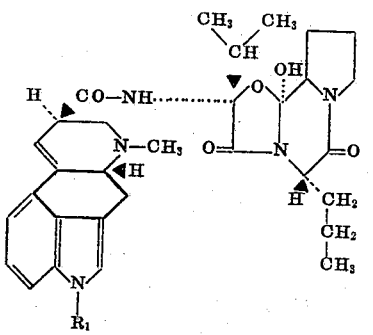

in which $R_1$ has the above significance. The compound of general formula XIII is preferably taken up in a solvent which is inert under the reaction conditions, a catalyst, e.g. palladium chloride or palladium on aluminum oxide, is added and hydrogenation is effected at room temperature or at a slightly elevated temperature and a pressure between normal pressure and about 81 atmospheres until the reaction is completed. After the taking up of hydrogen is completed, the catalyst is filtered off and the resulting compound of general formula I is isolated from the reaction mixture and purified in manner known per se.

2'β-Isopropyl-5'α-n-propyl-ergopeptine or 1-methyl-2'β-isopropyl-5'α-n-propyl-ergopeptine may be produced under the conditions described in Example 1, respectively, from lysergic acid or 1-methyllysergic acid and (2R,5S,10aS,10bS)-2-amino-3,6-dioxo-10b-hydroxy-2-isopropyl-5-(propyl-1)octahydro-8H-oxazolo[3,2-a]pyrrolo[2,1-c]-pyrazine hydrochloride.

The (2R,5S,10aS,10bS)-2-amino-3,6-dioxo-10b-hydroxy-2-isopropyl-5-(propyl-1)octahydro-8H-oxazolo[3,2-a]pyrrolo[2,1-c]pyrazine of formula II, used as starting material, is new, and also forms part of the present invention. In accordance with the invention, it is produced by condensing L-norvaline methyl ester with N-carbobenzoxy-L-proline with a reagent suitable for obtention of a peptide linkage, e.g. a mixed acid anhydride or ethoxy-acetylene, preferably, however, using dicyclohexyl carbodiimide, in a solvent or solvent mixture which is inert under the reaction conditions, to give N-carbobenzoxy-L-prolyl-L-norvaline methyl ester. The resulting N-carbobenzoxy-L-prolyl-L-norvaline methyl ester is then catalytically hydrogenated in crude state, whereby the carbobenzoxy protective radical is removed. The resulting dipeptide ester undergoes ring closure with the aid of an acid catalyst, e.g. benzoic acid, to form (3S,8aS)-1,4-dioxo-3-(propyl-1)octahydropyrrolo[1,2-a]pyrazine of formula V.

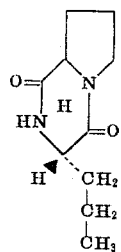

V

This is subsequently acylated with S(+)-2-benzyloxy-2-isopropylmalonic acid chloride monoethyl ester in the presence of a tertiary amine, e.g. pyridine or N-ethyl-diisopropyl amine, in a solvent which is inert under the reaction conditions, e.g. dioxane, preferably at a temperature of −10° to +90° C, to give the compound of formula VI.

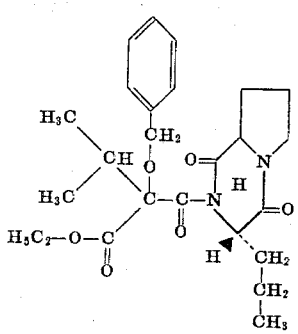

VI

This is dissolved in a solvent or solvent mixture which is inert under the reaction conditions, e.g. ethyl acetate, methanol, ethanol or glacial acetic acid/water, and the O-benzyl radical is subsequently removed hydrogenolytically, preferably with a prehydrogenated palladium catalyst, whereby spontaneous cyclization occurs to give (2R,5S,10aS,10bS)-2-ethoxycarbonyl-3,6-dioxo-10b-hydroxy-2-isopropyl-5-(propyl-1)octahydro-8H-oxazolo[3,2-a]pyrrolo[2,1-c]pyrazine of formula VII.

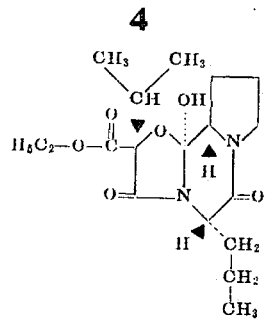

VII

This compound is then saponified by the action of a dilute aqueous alcoholic lye, or a dilute aqueous lye in a solvent which is inert under the reaction conditions, e.g. dioxane, to (2R,5S,a10aS,10bS)-2-carboxy-3,6-dioxo-10b-hydroxy-2-isopropyl-5-(propyl-1)octahydro-8H-oxazolo[3,2-a]pyrrolo[2,1-c]pyrazine of formula VIII,

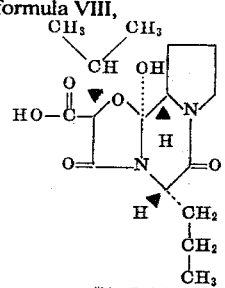

VIII and is then converted with phosphorus pentachloride or phosphorus pentabromide, in a solvent which is inert under the reaction conditions, e.g. ether, into a compound of general formula IX,

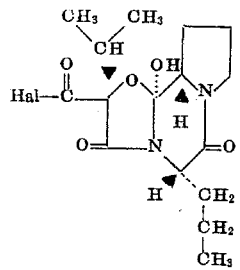

IX in which Hal signifies chlorine or bromine.

The production of the acid halide of formula IX may also be effected via an alkali metal salt of (2R,5S,10aS,10bS)-2-carboxy-3,6-dioxo-10b-hydroxy-2-isopropyl-5-(propyl-1)octahydro-8H-oxazolo-[3,2-a]pyrrolo[2,1-c]pyrazine with oxalyl chloride. Reaction of (2R,5S,10aS,10bS)-2-chloroformyl or 2-bromoformyl -3,6-dioxo-10b-hydroxy-2-isopropyl-5-(propyl-1)octahydro-8H-oxazolo[3,2-a]pyrrolo-[2,1-c]pyrazine, dissolved in an inert solvent, e.g. methylene chloride, with sodium azide then leads to the somewhat unstable acid azide of formula X.

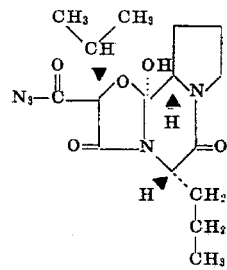

X

The acid azide is heated to the boil for a short time with a small excess of benzyl alcohol in an inert solvent, e.g. chloroform, whereby (2R,5S,10aS,10bS)-2-benzyloxy-carbonylamino-3,6-dioxo-10b-hydroxy-2-isopropyl-5-(propyl-1)octahydro-8H-oxazolo[3,2-a]pyrrolo[2,1-c]-pyrazine of formula XI

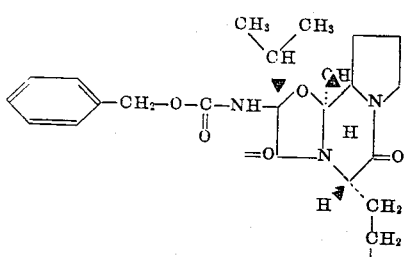

XI is obtained with nitrogen evolution via the intermediate isocyanate. The benzyloxycarbonyl radical is then split off hydrogenolytically in acid solution with the formation of a salt of (2R,5S,10aS,10bS)-2-amino-3,6-dioxo-10b-hydroxy-2-isopropyl-5-(propyl-1)octahydro-8H-oxazolo[3,2-a]pyrrolo[2,1-c]-pyrazine of formula II.

The compounds of general formula I obtained in accordance with the invention are crystalline compounds at room temperature and with strong organic or inorganic acids form stable salts which are crystalline at room temperature. Suitable acids for salt formation are inorganic acids, e.g. hydrochloric, hydrobromic or sulphuric acid, and organic acids, e.g. oxalic, maleic, tartaric and methanesulphonic acid.

The compounds of formula I are useful in the treatment of circulatory illnesses as indicated by their pharmacological properties in animals. In particular, the compounds subdue central circulatory reflexes as indicated by the carotide occlusion test in cats, reduce vasomotor tonus and exhibit a peripheral sympatholytic effect which is accompanied by vasodilatation as indicated by in vitro tests on the guinea pig ileum and in vivo tests on narcotized dogs. The compounds furthermore have a favorable influence on the subjective complaints of hypertonia and produce an increased secretion of urine.

For the above-mentioned use, the dosage administered will, of course, vary depending upon the compound employed, mode of administration and treatment desired. However, in general, satisfactory results are obtained when administered at a daily dosage of from about 0.001 to about 0.15 milligrams per kilogram animal body weight. For the larger mammals, the total daily dosage indicated is from 0.1 to 0.5 mg parenterally or 0.5 to 10 mg perorally administered in a single dose or divided doses two or three times a day.

The 1-methyl compound of formula I is furthermore useful in stimulating prolactin secretion, and thus milk production, as illustrated by an increase in prolactin secretion in rats at subcutaneous dosages ranging from about 0.3 to about 30 milligrams per kilogram animal body weight.

The stimulation of prolactin secretion is not weight related and practical daily dosages in larger mammals range from about 0.1 mg to about 5 mg per animal, administered enterally or parenterally in a single dose or divided doses two or three times a day, or conveniently in sustained release form. Dosage forms suitable for oral administration comprise from about 0.03 to about 5 milligrams of the compound admixed with a solid or liquid pharmaceutical carrier or diluent.

The new compounds may be used as medicaments on their own or in the form of appropriate medicinal preparations for oral, enteral or parenteral administration. In order to produce suitable medicinal preparations the compounds are worked up with pharmacologically inert adjuvants. Examples of such adjuvants are

| | |
|---|---|
| for tablets and dragées: | lactose, starch, talc and stearic acid; |
| for injectable solutions: | water, alcohols, glycerin and vegetable oils; |
| for suppositories: | natural or hardened oils and waxes. |

The preparations may furthermore contain suitable preserving, stabilizing and wetting agents, solubilizers, sweetening and coloring substances and flavorings.

In the following non-limitative Examples all temperatures are indicated in degrees Centigrade and are uncorrected.

The compounds of general formula I are named with trivial names in a manner analogous to the names of other, already known ergot peptide alkaloids, or their name is derived from the basic structure of formula XII.

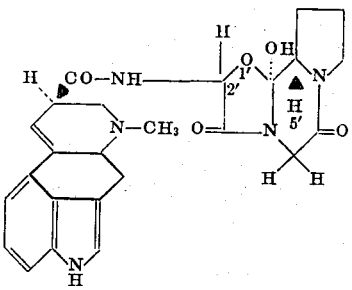

XII

The compound of formula XII is named ergopeptine. The alkaloids of general formula I are characterized by the prefix "9,10-dihydro". In the case of the compounds of general formula I, in which $R_1$ signifies methyl, the prefix "1-methyl" is used before the name.

Example 1: 2′β-Isopropyl-5′α-n-propyl-9,10-dihydro-ergopeptine.

39 g (120 millimols) of 9,10-dihydro-lysergic acid chloride hydrochloride and 20 g (58 millimols) of (2R,5S,10aS,10bS)-2-amino-3,6-dioxo-10b-hydroxy-2-isopropyl-5-(propyl-1)octahydro-8H-oxazolo[3,2-a]pyrrolo[2,1-c]pyrazine hydrochloride are suspended in 300 cc of dimethyl formamide and the suspension is stirred at −10°. 12 cc of anhydrous pyridine are added dropwise during the course of 15 minutes, whereby the suspension gradually dissolves. The solution is stirred at 25° for 90 minutes, whereby a crystalline precipitate results. After the addition of 10 cc of a 4 N sodium carbonate solution, the reaction mixture is evaporated to dryness at 30° at reduced pressure, the residue is dissolved in a mixture of 100 cc of methylene chloride/methanol (8:2) and 20 cc of a 4 N sodium carbonate solution, and the phases are separated. The organic phase is washed thrice with 20 cc amounts of a 4 N sodium carbonate solution, the combined aqueous phases are extracted 4 times with 50 cc amounts of methylene chloride/methanol (8:2), the combined organic phases are dried over sodium sulphate and animal charcoal and evaporated to dryness. The residue is recrystallized from ethyl acetate. 2′β-isopropyl-5′α-n-propyl-9,10-dihydro-ergopeptine, having a M.P. of 218°–221° (decomp.), $[\alpha]_D^{20} = +18°$ (c = 1, dimethyl formamide), is obtained.

Example 2: 1-Methyl-2′β-isopropyl-5′α-n-propyl-9,10-dihydro-ergopeptine.

7.5 g (13.4 millimols) of high vacuum dried 2′β-isopropyl-5′α-n-propyl-9,10-dihydro-ergopeptine are dissolved at −30° in a solution of 1.6 g of metallic sodium in 1,000 cc of liquid ammonia, and a solution of 11.3 g (80 millimols) of methyl iodide in 10 cc of absolute ether is then added dropwise at −30° to the reaction mixture. The resulting suspension is allowed to react at −40° while stirring for half an hour. Working up is effected by distilling off the ammonia in a vacuum, treating the residue with a potassium carbonate solution which has been cooled to 0° and extracting the mixture thrice with methylene chloride. The organic phases are washed with water, dried, and the volatile components are removed in a vacuum. The residue is recrystallized, whilst hot, from ethyl acetate. After recrystallizing again from ethyl acetate, thin layer chromatographically pure 1-methyl-2′β-isopropyl-5′α-n-propyl-9,10-dihydro-ergopeptine is obtained. M.P. 256°, $[\alpha]_D^{20} = -31°$ (c = 0.5, pyridine), Keller's color reaction: violet blue.

Example 3: (2R,5S,10aS,10bS)-2-Amino-3,6-dioxo-10b-hydroxy-2-isopropyl-5-(propyl-1)octahydro-8H-oxazolo-[3,2-a]pyrrolo[2,1-c]pyrazine hydrochloride.

a. (3S,8aS)-1,4-Dioxo-3-(propyl-1)octahydropyrrolo[1,2-a]pyrazine.

24.9 g (0.1 mol) of N- carbobenzoxy-L-proline and 13.3 g (0.1 mol) of freshly distilled L-norvaline methyl ester are dissolved in 100 cc of ethyl acetate, and 22.6 g (0.11 mols) of dicyclohexyl carbodiimide in 25 cc of ethyl acetate are added dropwise at 5°–10° while stirring. The reaction mixture is stirred at 40° for 1 hour, the precipitated dicyclohexyl urea is filtered off and the filtrate is washed with 1 N hydrochloric acid and then with 1 N ammonium hydroxide. After concentrating the ethyl acetate solution, petroleum ether is added and the N-carbobenzoxyl-L-proly-L-norvaline methyl ester, which crystallizes, is filtered off. M.P. 98°, $[\alpha]_D^{22} = +8°$ (c = 1, acetic acid).

36.2 g (0.1 mol) of N-carbobenzoxy-L-prolyl-L-norvaline methyl ester are dissolved in 400 cc of methanol and hydrogenation is effected with 2 g of palladium (10 percent) on active charcoal at room temperature and normal pressure. After filtering off the catalyst, the solvent is removed in a vacuum and the oily residue is dissolved in 100 cc of m-xylene. 40 mg of benzoic acid are added to the solution, about 20 cc of the solvent are distilled off and the reaction mixture is subsequently boiled under reflux for 5 hours. After cooling the solution, it is allowed to crystallize. After standing at about 0° for several days crystalline (3S,8aS)-1,4-dioxo-3-(propyl-1)-octahydropyrrolo[1,2-a]pyrazine (formula V) is obtained. M.P. 134°, $[\alpha]_D^{20} = -135°$ (±2°) (c = 1, ethanol).

b. (2R,5S,10aS,10bS)-2-Carboxy-3,6-dioxo-10b-hydroxy-2-isopropyl-5-(propyl-1)octahydro-8H-oxazolo[3,2-a]pyrrolo[2,1-c]pyrazine.

78.4 g (400 millimols) of (3S,8aS)-1,4-dioxo-3-(propyl-1)-octahydropyrrolo[1,2-a]pyrazine (formula V) are dissolved in 200 cc of dioxane, 144 g of N-ethyl-diisopropyl amine and 120 g (400 millimols) of S(+)-2-benzyloxy-2-isopropyl-malonic acid chloride monoethyl ester are added, and the mixture is heated to 70° while stirring for 3hours. The resulting thick mass, which contains the compound of formula VI, is dissolved in 600 cc of glacial acetic acid, and the solution is hydrogenated in the presence of 25 g of a 10 percent palladium charcoal at 50° and normal pressure. After the taking up of hydrogen is completed, another 5 g of catalyst are added and hydrogenation is continued. The catalyst is filtered off, the filtrate is dried at 30° and the residue is dissolved in ethyl acetate, the solution is washed with 1 N hydrochloric acid and subsequently with a 1 N sodium bicarbonate solution, and the organic solution is evaporated to dryness. The resulting (2R,5S,aS,10bS)-2-ethoxy-carbonyl-3,6-dioxo-10b-hydroxy-2isopropyl-5-(propyl-1)octahydro-8H-oxazolo[3,2-a]pyrrolo[2,1-c]pyrazine (formula VII) is dissolved in a mixture of 100 cc of dioxane and 550 cc of a 2 N caustic soda solution and the solution is allowed to stand at 25° for 4 hours. After cooling to 0° the pH of the solution is adjusted to 7.5 with 4 N sulphuric acid, the solution is concentrated by evaporation to half its volume, is washed with ethyl acetate, and the aqueous phase is acidified to pH 1 with 4 N sulphuric acid and extracted with ethyl acetate. This ethyl acetate extract is dried over sodium sulphate, evaporated to dryness, and the residue is recrystallized from ether. The resulting (2R,5S,10aS,10bS)-2-carboxy-3,6-dioxo-10b-hyroxy-2-isopropyl-5-(propyl-1)octahydro-8H-oxazolo[3,2-a]pyrrolo[2,1-c]pyrazine (formula VIII) has a M.P. of 147°–149° (decomp.), $[\alpha]_D^{20} = +29°$ (c = 1, dimethyl formamide).

c. (2R,5S,10aS,10bS)-2Chloroformyl-3,6-dioxo-10b-hydroxy-2-isopropyl-5-(propyl-1)octahydro-8H-oxazolo[3,2-a]pyrrolo[2,1-c]pyrazine.

27 g (130 millimols) of phosphorus pentachloride are suspended in a mixture of 320 cc of anhydrous diethyl ether and 320 cc of petroleum ether, the suspension is stirred at 25° for 60 minutes, is cooled to 10°, 34 g (100 millimols) of (2R,5S,aS,10bS)-2-carboxy-3,6-dioxo-10b-hydroxy-2-isopropyl-5-(propyl-1)octahydro-8H-oxazolo[3,2-a]pyrrolo[2,1-c]pyrazine are added, and the suspension is stirred at 25° for 4 hours. After filtration the crystalline mass is washed with ether/petroleum ether (1:1) and dried in a vacuum in the absence of moisture. (2R,5S,10aS,10bS)-2-Chloroformyl-3,6-dioxo-10b-hydroxy-2-isopropyl-5-(propyl-1)octahydro-8H-oxazolo[3,2-a]pyrrolo[2,1-c]pyrazine (formula IX, Hal = cl) is obtained. M.P. 115°–117° (decomp.), $[\alpha]_D^{20} = +33°$ (c = 1, methylene chloride). This compound is unstable and is used as rapidly as possible for the following synthesis step. When phosphorus pentabromide is used as halogenation agent, the corresponding (2R,5S,10aS,10bS)-2-bromoformyl-3,6-dioxo-10b-hydroxy-2-isopropyl-5-(propyl-1)octahydro-8H-oxazolo[3,2-a]pyrrolo[2,1-c]-pyrazine (formula IX, Hal = Br), is obtained.

d. (2R,5S,10aS,10bS)-2-Benzyloxy-carbonylamino-3,6-dioxo-10b-hydroxy-2-isopropyl-5-(propyl-1)octahydro-8H-oxazolo[3,2-a]pyrrolo-[2,1-c]pyrazine.

23.5 g (67 millimols) of (2R,5S,10aS,10bS)-2-chloroformyl-3,6-dioxo-10b-hydroxy-2-isopropyl-5-(propyl-1)octahydro-8H-oxazolo[3,2-a]pyrrolo[2,1-c]pyrazine are added gradually at −5°, while stirring vigorously, to a mixture of 250 cc of methylene chloride, 34 cc of water and 11.3 g (173 millimols) of sodium azide, and the mixture is stirred for a further 6 minutes. After separating the phases the aqueous phase is extracted with 100 cc of methylene chloride, the combined organic phases are washed with a 1 N sodium hydrogen carbonate solution, are dried over sodium sulphate and evaporated to dryness. The residue, which contains the compound of formula X, is dissolved in 130 cc of anhydrous and alcohol-free chloroform, 10.3 g (96 millimols) of benzyl alcohol are added, the solution is heated under reflux for 90 minutes, is concentrated by evaporation, and the crystalline residue is crystallized from diethyl ether. (2R,5S,10 aS,10bS)-2-benzyloxy-carbonylamino-3,6-dioxo-10b-hydroxy-2-isopropyl-5(propyl-1)octahydro-8H-oxazolo[3,2-a]pyrrolo-[2,1-c]pyrazine (formula XI) is obtained. M.P. 204°–205°, $[\alpha]_D^{20} = +35°$ (c = 1, pyridine).

The same reaction products of formulas X and XI may be obtained in a manner analogous to the process described above, using (2R,5S,10aS,10bS)-2bromoformyl-3,6-dioxo-10b-hydroxy-2-isopropyl-5(propyl-1)octahydro-8H-oxazolo[3,2-a]pyrrolo[2,1-c]pyrazine as starting material.

e. (2R,5S,10aS,10bS)-2-Amino-3,6-dioxo-10b-hydroxy-2-isopropyl-5-(propyl-1)octahydro-8H-oxazolo[3,2-a]pyrrolo[2,1-c]pyrazine hydrochloride.

49.5 g (111 millimols) of (2R,5S,10aS,10bS)-2-benzyloxy-carbonylamino-3,6-dioxo-10b-hydroxy-2-isopropyl-5-(propyl-1)octahydro-8H-oxazolo[3,2-a]pyrrolo[2,1-c]pyrazine are dissolved in a mixture of 200 cc of dimethyl formamide and 500 cc of dioxane, 34 cc of a 4 N hydrochloric acid solution in dioxane and 12 g of 10 percent palladium charcoal are added, and hydrogenation is effected at room temperature and normal pressure. After the taking up of hydrogen is completed, filtration is effected, the catalyst is washed with methylene chloride and the filtrate dried. After crystallizing the residue from 100 cc of tetrahydrofuran, (2R,5S,aS,10bS)-2-amino-3,6-dioxo-10b-hydroxy-2-isopropyl-5-(propyl-1)octahydro-8H-oxazolo[3,2-a]pyrrolo[2,1-c]-pyrazine hydrochloride (formula II) is obtained. M.P. 142° (decomp.), $[\alpha]$ The d-2-benzyloxy-2-isopropyl-malonic acid chloride monoethyl ester, used as starting material in step b), may be produced as follows:

a'. 2-Benzyloxy-2-isopropyl-malonic acid diethyl ester.

A sodium alcoholate solution prepared from 15 g of sodium and 300 cc of absolute ethanol is added dropwise while stirring and cooling slightly (to about 35°–45°) to 133 g (0.5 mols) of 2-benzyloxy-malonic acid diethyl ester and 110 g (0.6 mols) of diisopropyl sulphate during the course of 90 minutes. The reaction mixture is subsequently stirred at 45° for 2 hours and then at 60° for 1 hour. The reaction mixture is cooled to room temperature, is made neutral with glacial acetic acid, and 1.5 liters of water are added. Working up is effected by extracting several times with ether, washing the combined ethereal phases with a dilute aqueous sodium carbonate solution and subsequently with water. The ethereal extracts are dried over sodium sulphate and the solvent is evaporated. The remaining yellow oil is purified by distilling at a bath temperature of 200° and 0.1 mm of Hg.

2-Benzyloxy-2-isopropyl-malonic acid diethyl ester may also be produced as follows:

A solution of 5.75 g (0.25 mols) of sodium in 1.25 cc of absolute ethanol is slowly added dropwise at 45° to a mixture of 53.2 g (0.2 mols) of 2-benzyloxy-malonic acid diethyl ester and 51.0 g (0.3 mols) of isopropyl iodide, while stirring vigorously and passing through a stream of nitrogen during the course of 2 ½ hours, and the golden yellow, viscous reaction solution is subsequently stirred at 45° for 2 ½ hours. After cooling to room temperature, about 50 cc of ice water are added, the pH of the solution is adjusted to 5 with 10 N phosphoric acid and extraction is effected with ether. The ethereal phase is washed until neural with a saturated common salt solution, is dried over sodium sulphate and concentrated. After distilling the residue in a high vacuum with the separation of a small amount of first runnings, a colorless oil, having a B.P. of 125°–127°/0.03 mm of Hg, $n^{21}_D = 1.4827$, is obtained. The oil is gas chromatographically pure, the NMR spectrum determines the structure.

A further process for the production of 2-benzyloxy-2-isopropyl-malonic acid diethyl ester is as follows:

218 g (1 mol) of 2-hydroxy-2-isopropyl-malonic acid diethyl ester are added dropwise while cooling to 20°–30°, to 6.3 g (1.3 mols) of a 50 percent sodium hydride dispersion in paraffin oil. After hydrogen evolution is completed, the reaction mixture is heated to 70° and 205 g (1.2 mols) of benzyl bromide are added dropwise while cooling slightly (70°–75°). The reaction mixture is subsequently heated to 75° for 2 hours, 130 cc of absolute alcohol are added and the temperature is kept at 75° for a further 30 minutes. After cooling to room temperature the reaction mixture is made neutral with glacial acetic acid, 4 liters of water are added and extraction is effected with ether, and the ethereal extract is washed with water and a sodium bicarbonate solution. The ethereal phase is dried over sodium sulphate, the ether is distilled off and the residue is distilled in a high vacuum at a bath temperature of 180°. Pure 2-benzyloxy-2-isopropyl-malonic acid diethyl ester, having a B.P. of 120°–140°/0.2 mm of Hg, is obtained.

b'. 2-Benzyloxy-2-isopropyl-malonic acid monoethyl ester.

924 g (3.0 millimols) of 2-benzyloxy-2-isopropyl-malonic acid diethyl ester are dissolved in 2,400 cc of ethanol, 4,400 cc (6.15 millimols) of a 1.40 N solution of potassium hydroxide in ethanol are added while stirring, and the reaction mixture is stirred at 25° for 16 hours. After the addition of 3,000 g of ice the pH of the solution is adjusted to 8.0 with about 120 cc of concentrated phosphoric acid, and the ethanol is removed in a vacuum at 30–40°. After the addition of 3,000 cc of distilled water, the pH of the solution is adjusted to 8 to 9 with about 180 cc of a 4 N caustic soda solution. The resulting light yellow solution is extracted thrice with 1000 cc amounts of ether, whereby the ethereal extract is counterextracted each time with 60 cc of a 10 percent sodium bicarbonate solution, and the combined sodium bicarbonate extracts are added to the aqueous solution. The alkaline, aqueous solution is cooled to −5°, is covered with a layer of 3,000 cc of ether and is subsequently acidified to pH 2 by the slow addition of about 840 cc of concentrated phosphoric acid while stirring vigorously. The two phases are separated and the aqueous phase is extracted twice with 600 cc amounts of ether. The combined ether solutions are washed (4 to 5 times) with 600 amounts of water until the wash water has a pH value of 4, whereby the wash water is counterextracted each time with 100 cc of ether. The combined ethereal solutions are washed twice with 600 cc amounts of a 30 percent sodium chloride solution, are dried over sodium sulphate, filtered off, concentrated and dried in a high vacuum until a constant weight is obtained. A viscous, slightly yellowish oil is obtained, which is homogeneous in accordance with thin layer chromatography (silica gel), eluant: methanol and chloroform/methanol (7:3). $n_D^{20} = 1.4988$.

c'. R(+)-2-Benzyloxy-2-isopropyl-malonic acid monoethyl ester.

1460 g (8.83 mols) of d-pseudo-ephedrine, which has been dried in a high vacuum at 50° for 16 hours, are added to a solution of 2330 g (8.32 mols) of racemic 2-benzyloxy-2-isopropyl-malonic acid monoethyl ester in 15 liters of ether over sodium wire, and the reaction mixture is heated with 1 g of the diastereoisomer formed from d-pseudo-ephedrine and S(−)-2-benzyloxy-2-isopropyl-malonic acid monoethyl ester, and is allowed to stand at 0° for 2 days. A crystalline crust is formed, which is decanted and washed with 1,000 cc of anhydrous ether. 3,000 g of ice are added to the ethereal solution and the solution is acidified by the careful addition of concentrated phosphoric acid while stirring vigorously. After separating the phases, the aqueous phase is extracted thrice with 1,000 cc amounts of ether. The combined ethereal phases are washed 5 times with 2,000 cc amounts of water and the wash water is extracted each time with 500 cc of ether which are added to the combined ether phase. The pH of the last wash water should amount to about 4. After washing the ethereal phase with 2,000 cc of a 30 percent common salt solution, it is dried over sodium sulphate and the solution is dried. A viscous, oily residue is obtained, which is dried in a rotary evaporator with slow rotation at 30°, in a high vacuum for 16 hours, until a constant weight is obtained. The resulting oil, enriched with R(+)-2-benzyloxy-2-isopropyl-malonic acid monoethyl ester, is dissolved in 12 liters of ether on sodium wire and 1,127 g (6.81 mols) of d-pseudo-ephedrine, which has been dried in a high vacuum at 50° for 16 hours, are added while stirring vigorously and in the absence of moisture. After the material has dissolved (2 to 3 minutes) and after seeding with the diastereoisomer formed from d-pseudo-ephedrine and R(+)-2-benzyloxy-2-isopropyl-malonic acid ethyl ester, the solution is allowed to stand at 0° for 2 days. The crystalline crust is decanted and the crystalline mass is washed 5 times with 1,000 cc amounts of anhydrous ether. The resulting diastereoisomer formed from R(+)-2-benzyloxy-2-isopropyl-malonic acid monoethyl ester and d-pseudo-ephedrine, is suspended in 5,000 cc of ether, 3,000 g of ice and 685 cc of concentrated phosphoric acid are added while stirring, the phases are separated, the aqueous phase is extracted thrice with 1,000 cc amounts of ether and the combined ethereal solutions are washed 5 times with 1,000 cc amounts of water, and counterwashed each time with 300 cc of ether. The pH of the last wash water should amount to 4. The combined ethereal solutions are washed with 1,000 cc of a 30 percent common salt solution, are dried over sodium sulphate, evaporated to dryness and dried in a high vacuum in a rotary evaporator with slow rotation. The residue is homogeneous in the thin layer chromatogram on silica gel in chloroform/methanol (7:3) (development with potassium permanganate). $[\alpha]_D^{20} = +8.2°$ (c = 5.0, ethanol).

d'. S(+)-2-Benzyloxy-2-isopropyl-malonic acid chloride monoethyl ester.

981 g (3.5 mols) of R(+)-2-benzyloxy-2-isopropyl-malonic acid monoethyl ester are dissolved in 1,500 cc of methylene chloride, the solution is cooled to −20°, a solution of 560 cc (3.85 mols) of dimethyl formamide in 530 cc of methylene chloride is added, and subsequently a solution of 328 cc (4.55 mols) of thionyl chloride in 328 cc of methylene chloride is added dropwise while stirring vigorously, the cooling bath is removed and the reaction mixture is stirred at 25° for 16 hours. The methylene chloride is evaporated off in a vacuum at 30° and the bath temperature is subsequently raised from 30° to 70°. As soon as distillation stops, this is continued in a high vacuum at a bath temperature of 70° for another 3 hours, whereby a white by-product which reacts violently with water, sublimates. A heterogeneous, dark brown mixture is obtained, which is kept at −15° over night. A dark, crystalline mass separates. The liquid is decanted in the absence of moisture and is distilled twice in a high vacuum at a bath temperature of 140°, without fractionation and in the absence of moisture, whereby each distillation should not exceed 3 hours (distillation temperature 120°/0.3 mm of Hg, and 105°/0.05 mm of Hg). A slightly yellowish liquid is obtained. $n_D^{20} = 1.5008$, $[\alpha]_{D20} = +51.3°$ (c = 5.0, benzene).

EXAMPLE 4: 2'β-Isopropyl-5'α-n-propyl-9,10-dihydro-ergopeptine.

5.64 g of 2'β-isopropyl-5'α-n-propyl-ergopeptine are dissolved in 50 cc of methylene chloride/methanol (1:1) and hydrogenation is effected on 2.5 g of prehydrogenated palladium on aluminum oxide in 15 cc of methanol at room temperature and normal pressure. After 2 hours hydrogenation stops after 220 cc of hydrogen have been taken up. The catalyst is filtered off, washing is effected with methylene chloride, the filtrate is concentrated to a foam and the title compound is crystallized from ethyl acetate. After drying in a high vacuum at 100° for 4 hours: decomposition point 218°–221°, $[\alpha]_D^{20}=$ +18° (c = 1, dimethyl formamide).

WHAT IS CLAIMED IS:

1. A compound of the formula:

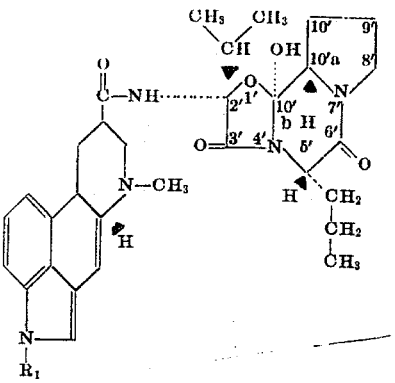

wherein $R_1$ is hydrogen or methyl, or a pharmaceutically acceptable acid addition salt thereof.

2. The compound of claim 1, which is 2'β-isopropyl-5'α-n-propyl-9,10-dihydro-ergopeptine.

3. The compound of claim 1, which is 1-methyl-2'β-isopropyl-5'α-n-propyl-9,10-dihydro-ergopeptine.

* * * * *

UNITED STATES PATENT OFFICE
CERTIFICATE OF CORRECTION

Patent No. 3,666,762    Dated May 30, 1972

Inventor(s) Stephan Guttman and Rene Huguenin

It is certified that error appears in the above-identified patent and that said Letters Patent are hereby corrected as shown below:

Assignee: SANDOZ LTD., Basle, Switzerland

In the Abstract and at Column 1, line 8 and in Claim 1 structure of the compounds shown should be as follows:

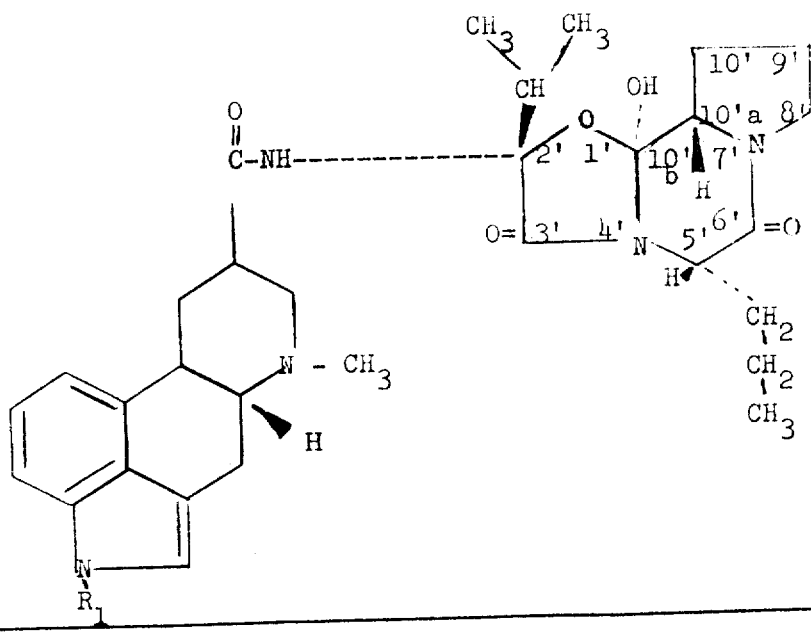

UNITED STATES PATENT OFFICE
CERTIFICATE OF CORRECTION

Patent No. 3,666,762           Dated May 30, 1972

Inventor(s) Stephan Guttman and Rene Huguenin

It is certified that error appears in the above-identified patent and that said Letters Patent are hereby corrected as shown below:

Column 5 line 17    insert a bracket before the number 2 so that it reads as follows

-- [ 2,1-c ] --.

Column 5 line 28    change the word "carotide" to read

-- carotid --.

Column 5 line 16    delete the bracket after the word pyrrolo.

UNITED STATES PATENT OFFICE
CERTIFICATE OF CORRECTION

PAGE - 3

Patent No. 3,666,762                           Dated May 30, 1972

Inventor(s) Stephan Guttman and Rene Huguenin

It is certified that error appears in the above-identified patent and that said Letters Patent are hereby corrected as shown below:

Structure V should read as follows:

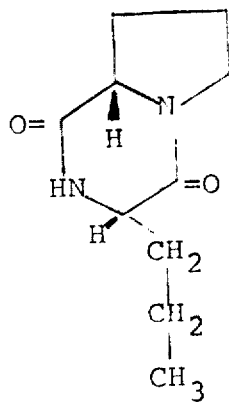

Structure XI should read as follows:

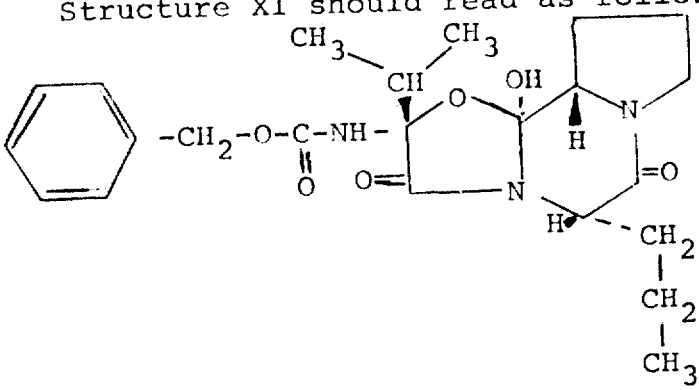

UNITED STATES PATENT OFFICE
CERTIFICATE OF CORRECTION

Patent No. 3,666,762　　　　　　　　　Dated May 30, 1972

Inventor(s)　Stephan Guttman and Rene Huguenin

It is certified that error appears in the above-identified patent and that said Letters Patent are hereby corrected as shown below:

Structure VI should read as follows:

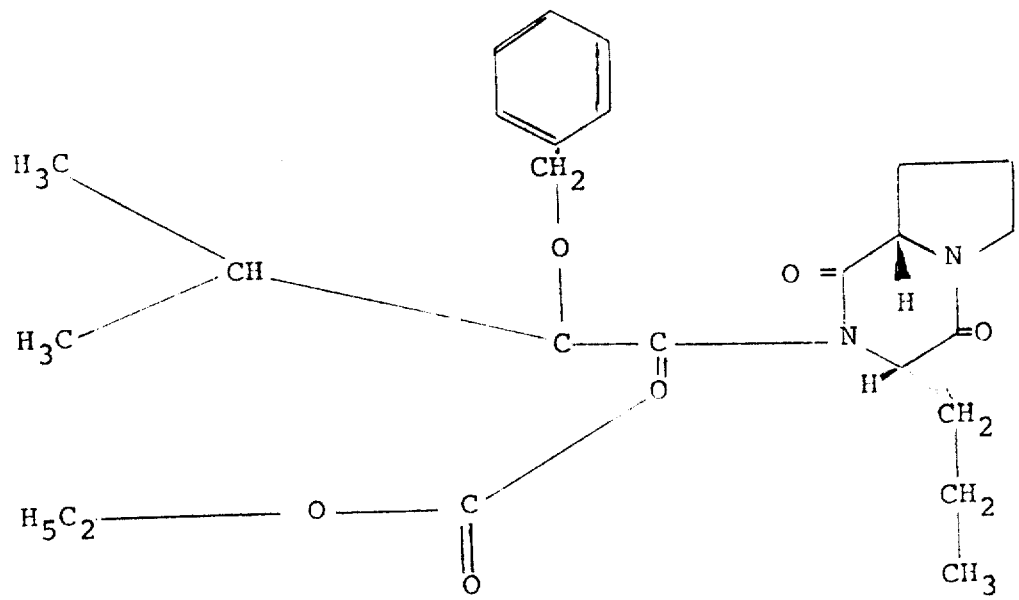

Signed and sealed this 27th day of November 1973.

(SEAL)
Attest:

EDWARD M. FLETCHER, JR.　　　　　RENE D. TEGTMEYER
Attesting Officer　　　　　　　　　Acting Commissioner of Patents